United States Patent [19]

Hilsenteger et al.

[11] Patent Number: 5,216,285
[45] Date of Patent: Jun. 1, 1993

[54] FREIGHT CAR WITH ELECTRICAL POWER DISTRIBUTION

[75] Inventors: James A. Hilsenteger, Portland, Oreg.; Kenneth W. Lipps, Skamania, Wash.; Frank D. Butchart, Portland; Annaliese Hammer, Gresham, both of Oreg.

[73] Assignee: Gunderson, Inc., Portland, Oreg.

[21] Appl. No.: 840,845

[22] Filed: Feb. 24, 1992

[51] Int. Cl.⁵ .................................................. H02J 4/00
[52] U.S. Cl. ...................................... 307/12; 307/9.1; 307/31
[58] Field of Search ....................... 307/9.1, 11, 12, 31, 307/36, 38, 42, 149; 361/91; 280/422; 191/11; 213/1.3

[56] References Cited

U.S. PATENT DOCUMENTS

| | | | |
|---|---|---|---|
| Re. 22,168 | 9/1942 | Hamilton | 171/97 |
| 2,163,400 | 6/1939 | Logan, Jr. | 171/313 |
| 2,563,571 | 8/1951 | Woods | 171/97 |
| 2,564,121 | 8/1951 | Melcher | 290/3 |
| 3,497,707 | 2/1970 | Stewart | 307/9 |
| 4,017,136 | 4/1977 | Sasgen | 339/28 |
| 4,343,522 | 8/1982 | O'Neil | 339/10 |
| 4,680,663 | 7/1987 | Nogi et al. | 307/38 |
| 4,795,859 | 1/1989 | Kato et al. | 307/9.1 |
| 4,893,567 | 1/1990 | Hill et al. | 105/419 |

Primary Examiner—Jeffrey A. Gaffin
Attorney, Agent, or Firm—Chernoff, Vilhauer, McClung & Stenzel

[57] ABSTRACT

A multi-unit railway freight car of which each unit defines a container well for receiving cargo containers, and including a permanently installed power distribution cable arrangement, for receiving power from a generator carried in a container well and for providing power to containers carried in other container wells and container-carrying positions of the car units. Cables and terminal devices are located in positions largely protected from mechanical damage, and circuit breakers are associated with the cables to protect the cables and the generator from overloads.

14 Claims, 5 Drawing Sheets

FREIGHT CAR WITH ELECTRICAL POWER DISTRIBUTION

BACKGROUND OF THE INVENTION

The present invention relates to multi-unit railway freight cars for carrying intermodal cargo containers, and particularly to such freight cars for carrying cargo containers including equipment requiring an outside source of electric power.

Multi-unit articulated railway freight cars have been used widely in the past several years, and some such cars include a container well in each car unit for receiving one or more cargo containers. Some of such cars are also able to carry at least one additional container stacked atop a container or containers carried in the container well.

Such cargo containers may include equipment such as refrigeration machinery powered by electric motors requiring an external source of electricity, and it is known to carry an engine-driven electric power generator on one unit of a multi-unit freight car to provide electrical power to operate equipment such as refrigeration units included in one or more of the cargo containers carried on any unit of such a car. Such generators are usually included in generator units which include structure to replace a standard cargo container and thus provide support for a cargo container carried atop such a generator unit.

In the past, however, electrical connection from such a generator unit to each cargo container requiring power has been by the provision of an individual power cable extending along the car and intervening cargo containers to each cargo container requiring electrical power. Such electric power cables have thus been located outside the car structure, where they are exposed to possible damage by contact with loaders used to move containers onto or remove containers from freight cars. Such cables, when in place and connected to provide power to equipment included in a cargo container, are still somewhat exposed to the risk of being snagged while the car travels along a railway. Additionally, such cables are exposed to being grabbed as handles by persons intending to climb onto a car or onto a container carried on a car, and there is thus a definite safety hazard involved in such use of individual cables.

Considerable amounts of time and labor are involved in installation or removal of individual cables to carry electrical power from a generator unit to each individual container requiring such electrical power, as the cables must be moved out of the way each time the container-carrying car is loaded or unloaded. Such removal and replacement of cables is not only time-consuming but undesirably expensive, as the cables are exposed to damage or possible theft, and expose the personnel handling them to possible electrical shock or other injury.

Permanently installed receptacles are well known in railway cars for intercar delivery of electrical power through jumper cables as is disclosed in O'Neil U.S. Pat. No. 4,343,522 and Sasgen U.S. Pat. No. 4,017,136.

It is also well known to utilize permanently installed cables in railway passenger cars, to distribute electrical power provided by a generator carried in a remote car, as is disclosed in Melcher U.S. Pat. No. 2,564,121 and Kennedy U.S. Pat. No. 1,908,985.

Stewart U.S. Pat. No. 3,497,707 discloses an interconnection and control system for delivering electric power from a supply system located in an automobile to an associated trailer.

Woods U.S. Pat. No. 2,563,571 discloses an electrical distribution system for interconnecting the auxiliary electrical systems of railroad cars coupled to one another, in order to improve efficiency of the use of electrical power generated on one of a series of interconnected passenger cars.

Logan, Jr., U.S. Pat. No. 2,163,400 discloses a control system for distributing low voltage power for auxiliary use among several cars of an electric train. The disclosure is not related, however, to distribution of electrical power in freight cars for use by equipment carried in cargo containers on such freight cars.

Hamilton U.S. Re. Pat. No. 22,168, a reissue of U.S. Pat. No. 2,153,247, shows a power supply system for providing electricity to several cars of a railroad train from a generator located in one car. The power supply system controls the electric power to make sure that dangerous voltage is not available at car couplers where there are no adjacent cars.

The prior art, however, does not disclose a practical multi-unit container-carrying railway freight car including any convenient system for distributing electrical power from a generator carried in one of the several car units and making the electric power available for use by equipment included in containers carried in any of the several car units. What is desired, then, is a multi-unit railway freight car in which electrical power can be provided to equipment included in cargo containers, with less risk of damage to electrical cables, and with equal or better reliability than has previously been possible, and with a reduced risk of injury to personnel involved with loading, unloading, and operating such a freight car.

SUMMARY OF THE INVENTION

The present invention provides a multi-unit articulated railway freight car including an electrical power distribution system, for receiving power from a generator unit which can be carried optionally in one of the units of the multi-unit car, and for distributing the available electric power to equipment included in intermodal cargo containers carried at any of the positions available in the car for carrying such containers.

In a multi-unit container-carrying railway freight car which is a preferred embodiment of the invention, a pair of main electrical power cables are connected to power feed receptacles located near each other on one car unit. The main power cables extend, respectively, in opposite directions from the location of the feed receptacles. Power outlet terminals are provided on each of the car units to which either one of the main power cables extends, in locations which are convenient for connection of pigtail power cables associated with electrically powered equipment of cargo containers carrier in the car unit.

Preferably, major portions of each main power cable extending longitudinally of a car unit are located in protected positions defined by the structure of the car unit. For example, in a preferred embodiment of the invention, such a longitudinal portion of a power cable extends along a side wall of a car unit's container well, where it is protected by a structural plate forming an outer side of the container well wall, and where a main load-bearing structural member of the container well wall is located protectively above the longitudinal portion of the main power cable. Preferably, the main power cable on each car unit is located where container-handling equipment cannot normally come into contact with the cable and where a container being placed into the container well cannot be brought into contact with the main power cable.

In a preferred embodiment of the invention, a circuit breaker is provided at the power input feed receptacle end of each main power cable to protect the generator which provides power to the cable and to protect the cable itself against excessive current load, and each power outlet receptacle to which the main power cable is connected includes an overload-preventing device, in order to isolate electrically-driven equipment on one cargo container from electrically-driven equipment included in other cargo containers being carried on the same car.

It is therefore a principal object of the present invention to provide an improved railway freight car for carrying intermodal cargo containers of various types, including those requiring an external source of electricity during carriage.

It is a further object of the present invention to provide a multi-unit articulated container-carrying railway car equipped for carrying a generator unit to provide and safely distribute electric power to equipment included in intermodal cargo containers carried on the car.

Yet another object of the present invention is to provide a multi-unit container-carrying railway freight car having an electrical power distribution system including main power cables and terminals therefor, all carried in locations protected safely by the structure of the car from intentional or accidental damage.

It is an important feature of the present invention that it provides a simple distribution system for electric power including overload protection at each power input and outlet terminal.

It is another important feature of the present invention that it provides electric power distribution cables which are located in positions protected by the structure of the well walls of the container-carrying railway freight car.

It is yet a further feature of the present invention that it includes an electrical power cable and power outlet terminals located on each car unit of a multi-unit car to provide electrical power from a single generator unit to containers in any of the possible container locations within the car.

An advantage of the present invention is that electrical power distribution cables in a freight car according to the present invention are less subject to damage, loss, or pilferage than was the case with previous arrangements for distribution of power from a generator unit to cargo containers carried in railway car.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
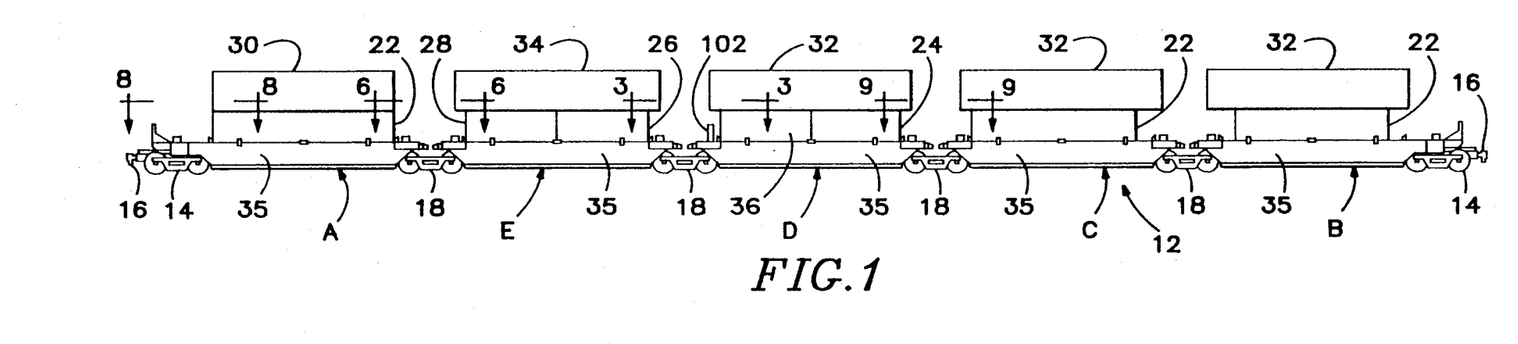
FIG. 1 is a side elevational view of an exemplary multi-unit container-carrying railway freight car according to the present invention, showing the locations for carriage, of cargo containers thereon.
Figure 2:
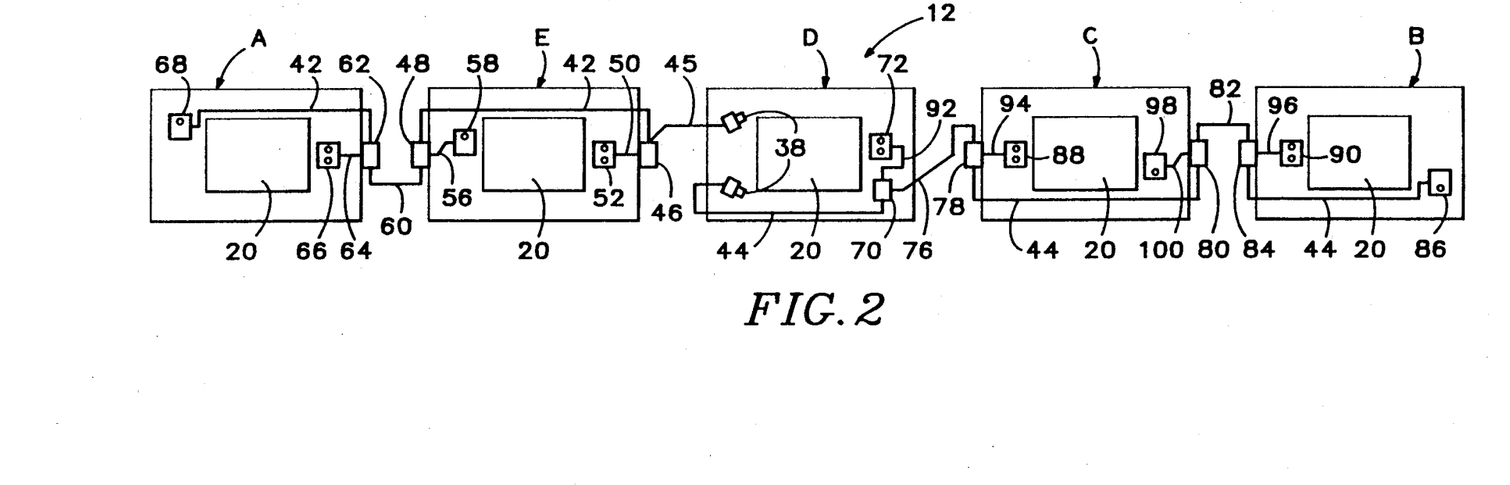
FIG. 2 is a schematic top plan view of the car shown in FIG. 1, illustrating the locations of main electrical power cables and terminals for distributing power from a generator unit which may be carried in one of the several car units.

Referring now to FIGS. 1 and 2 of the drawings which form a part of the disclosure herein, a multi-unit railway freight car 12 embodying the present invention includes five articulated car units. An A-unit, at a first end of the car 12, and a B-unit, at the opposite end of the car 12, both have respective trucks 14 and conventional couplers 16 by which the car 12 can be joined with other cars in a train. Between the A-unit and the B-unit are three additional car units, a C-unit, a D-unit and an E-unit. The several units are interconnected with one another by articulating couplings which are semi-permanent in nature, with the adjacent ends of each pair of such adjoining car units being carried upon a single four-wheeled truck 18. The E-unit is coupled to the A-unit, while the D-unit is coupled to the opposite end of the E-unit, and the C-unit is located between the D-unit and the previously-mentioned B-unit. Each unit of the car defines a container-carrying well 20 (shown schematically in FIG. 2) in which one or more intermodal cargo containers, such as the cargo containers 22, 24, 26, 28, may be received. Additional cargo containers, such as the containers 30 and 32, may also be carried stacked atop the previously-mentioned containers located in the container wells 20.

In a multi-unit container-carrying freight car such as the car 12, each car unit includes a pair of generally vertical side walls 35 extending longitudinally of the car and spaced apart from one another laterally of the car to define the container well 20 and provide the majority of the longitudinal rigidity of the car unit. Additionally, container support assemblies 37 and container floor support members 39, shown in FIG. 3, extend laterally between the side walls of each unit, adding to the rigidity of each unit and providing vertical support to containers carried within the container wells 20.

At each end of each car unit a transverse body bolster 41 (FIG. 3) or 43 (FIGS. 8, 11) extends horizontally between the side wall structures to transfer the structural loads imposed on the side walls by the containers to the respective truck 14 or 18. The body bolsters 41, 43 are thus located outside, but adjacent to the container wells 20.

Certain intermodal cargo containers, such as the containers 24, 26, 28, 30, and 34, for example, may be refrigerated containers requiring electrical power from an outside source to maintain a reduced temperature within such containers while they are being transported. In order to supply such electric power, then, a generator unit 36 is carried in the D-unit. The generator unit 36 may include a supply of engine fuel, an internal combustion engine, and an electrical power generator driven thereby, together with associated automatic controls for operation of the generator to provide electric power for distribution to the refrigeration units of the cargo containers 24, 26, 28, 30, and 34.

Figure 3:
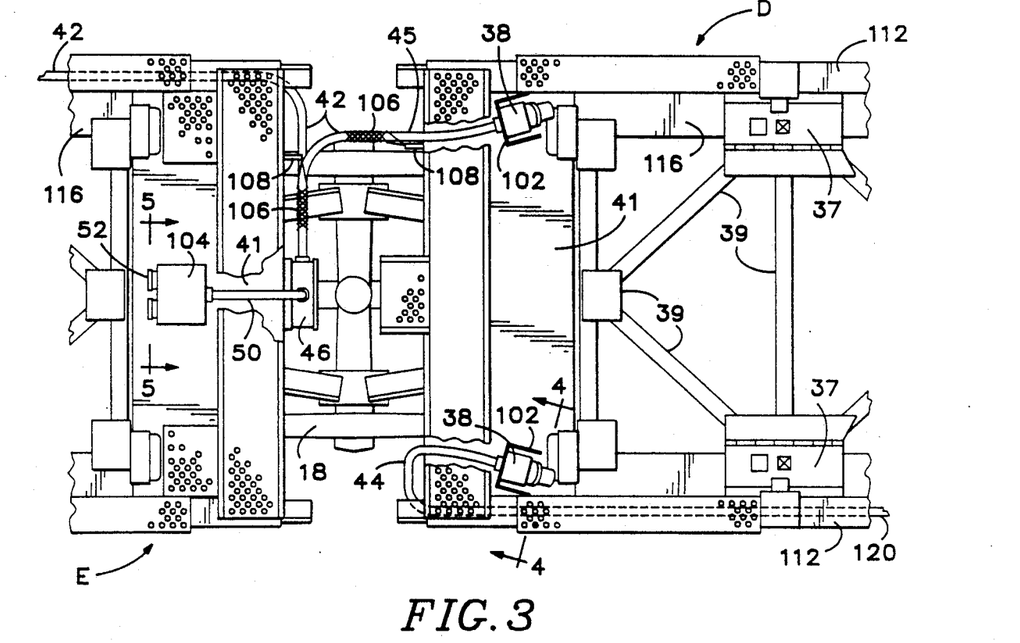
FIG. 3 is a top plan view of a portion of the "A" end of the D-unit, and the adjacent "B" end of the E-unit of the car shown in FIGS. 1 and 2, taken along line 3—3 of FIG. 1, at an enlarged scale.
Figure 4:
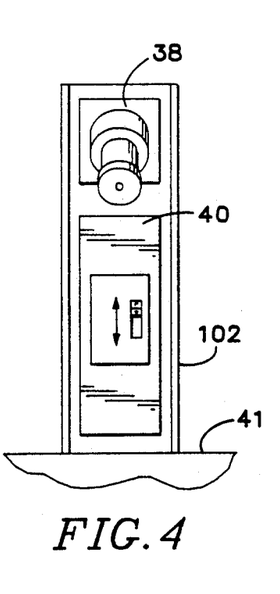
FIG. 4 is a view of a power feed receptacle located on the D-unit, taken in the direction of line 4—4 of FIG. 3, at an enlarged scale.
Figure 5:
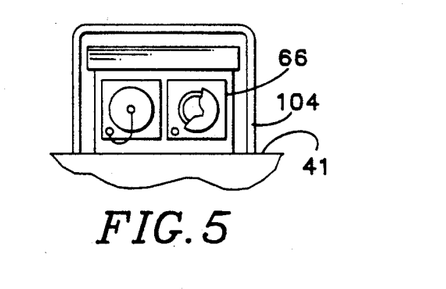
FIG. 5 is a view of a dual plug power outlet receptacle, taken along line 5—5 of FIG. 3, at an enlarged scale.

In accordance with the present invention, the D-unit includes a pair of power feed receptacles or terminals 38 located atop the body bolster 41 at the "A" end of the D-unit, as is shown in greater detail in FIGS. 3 and 4. Each of the power feed receptacles 38 is connected to a respective circuit load limiting protective device such as a circuit breaker 40 through which power is delivered to a respective one of a pair of main power transmission cables 42, 44 which extend in opposite directions from the "A" end of the D-unit to power delivery terminals to be described. The cable 42 extends from the D-unit to the E-unit and the A-unit of the car, extending from the circuit breaker 40 through a flexible jumper segment 45 from the "A" end of the D-unit to a junction box 46 located on the end face of the body bolster 41 of the "B" end of the E-unit, thence longitudinally along one side wall 35 of the E-unit to a junction box 48 located at the "A" end of the E-unit. Each of the cables 42 and 44 is made up of several interconnected segments, as will become clear presently.

A branch cable 50 extends from the junction box 46 to a dual plug power outlet receptacle 52, located at the "B" end of the E-unit. The principal portion of the cable 42 extends laterally from the junction box 46 to one side of the E-unit and longitudinally along the side of the E-unit to its "A" end. At the "A" end of the E-unit the cable 42 extends laterally toward the longitudinal centerline of the car 12 and into the junction box 78.

A branch cable section 56 connected to the power cable 42 extends from the junction box 48 to a single plug power outlet receptacle 58 located atop the body bolster 41, adjacent the container well 20 at the "A" end of the E-unit. The E-unit is thus provided with power outlet receptacles for the respective plugs of the individual pigtail power cables from the three refrigeration units of the cargo containers 26, 28 and 34 carried on the E-unit. The refrigeration units of the containers 34 and 26 receive needed electrical power from the dual plug outlet 52 at the "B" end of the E-unit, while the refrigeration unit or other electrically-powered equipment of the container 28, carried in the "A" end of the container well 20 of the E-unit, receives power through its own pigtail power cable from the single plug power outlet receptacle 58 located at the "A" end of the E-unit.

A flexible jumper cable section 60 of the cable 42 extends in a horizontal "U" shape from the junction box 48 on the "A" end of the E-unit to similar junction box 62 mounted on the body bolster 41 of the "B" end of the A-unit, allowing for relative movement of the A-unit relative to the E-unit. The principal portion of the cable 42 extends laterally from the junction box 62 back toward the side wall of the A unit and thence longitudinally along the well wall of the A-unit to the "A" end of the A-unit. A branch cable 64 connected to the cable 42 in the junction box 62 extends to a dual plug outlet receptacle 66, similar to the outlet receptacle 52, located atop the body bolster 41 at the "B" end of the A-unit.

Figure 8:
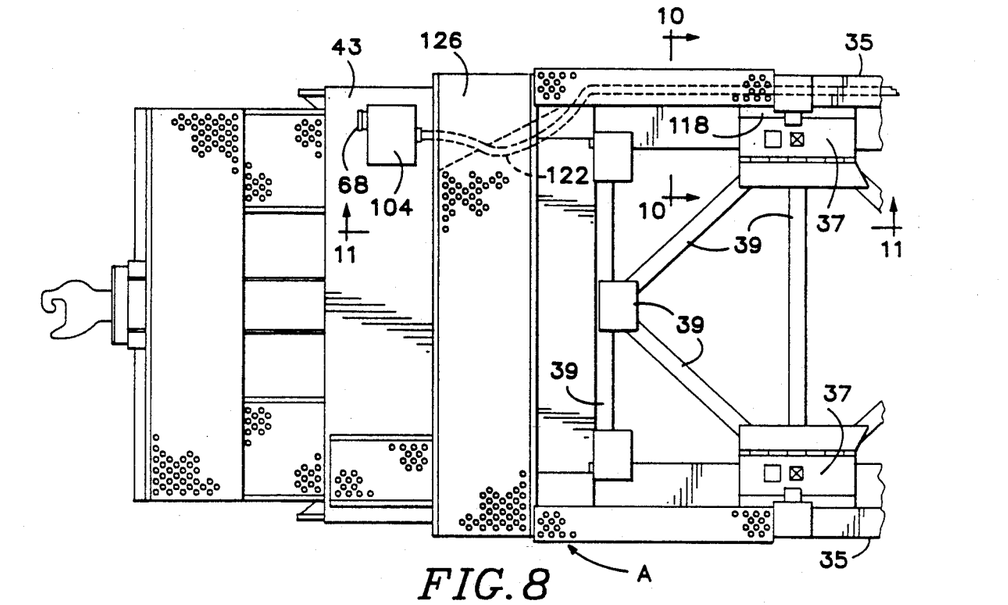
FIG. 8 is a top plan view of the "A" end of the A-unit of the car shown in FIG. 1, taken in the direction of line 8—8 of FIG. 1, at an enlarged scale.

The cable 42 extends along the side wall 35 to the "A" end of the A-unit, as shown in FIG. 8, and to a single plug power outlet receptacle 68, similar to the power outlet receptacle 58. The power outlet plug receptacles 52, 58, 66, and 68 thus are available to accept plugs attached to power cables (not shown) extending from equipment such as a refrigeration unit of one of the cargo containers 26, 28, 30 or 34 carried in any one of the possible positions of the A-unit or E-unit. If two short cargo containers such as the containers 38 and 26 are carried together in the container well of either the A-unit or the E-unit, a power cable from electrical equipment of each such short container can be connected to the plug receptacle at the respective closer end of the car unit. A container such as the container 30 or 34 carried atop either one or two containers carried in a container well of either the A-unit or the E-unit can then be connected to receive electrical power through the respective double plug receptacle 52 or 66.

The power receptacles 38 are preferably 200 ampere, 3-wire, 4-pole male reverse service receptacles with 1½-inch hubs, to accept conventional connectors from the generator unit 36. A satisfactory power input plug receptacle 38 is a pin-and-sleeve type receptacle available from Appleton Electric Company of Chicago, Ill.

The circuit breakers 40 are preferably rated to carry 100 amperes as steady load, and to protect the generator unit 36 and the cable 42 or 44 related to the particular circuit breaker. A satisfactory circuit breaker is an instantaneous trip, magnetic only circuit breaker with an adjustable trip range of 300–1100 amperes available from Square D Company of Palatine, Ill.

Satisfactory power outlet plug receptacles are the 32 ampere, 3-wire, 4-pole plug receptacles with control rods and indexed load limiting devices available from Marine Industrial Products Company of Brooksville, Fla. as their CEE-17 3 h module assembly. Preferably, the main power cables 42 and 44 are rated to carry at least 100 amperes at 440 VAC. For example, #2 size, type SO cable is used for the jumper segments 45, 60, while the longitudinal segments are preferably of #2 size, THHN insulated, copper electrical wire.

Referring again to FIG. 2, the main power transmission cable 44 extends from the circuit breaker 40 associated with the second power feed receptacle at the "A" end of the D-unit longitudinally along one side of the D-unit, to a junction box 70 located atop the body bolster 41 at the "B" end of the D-unit.

Figure 6:
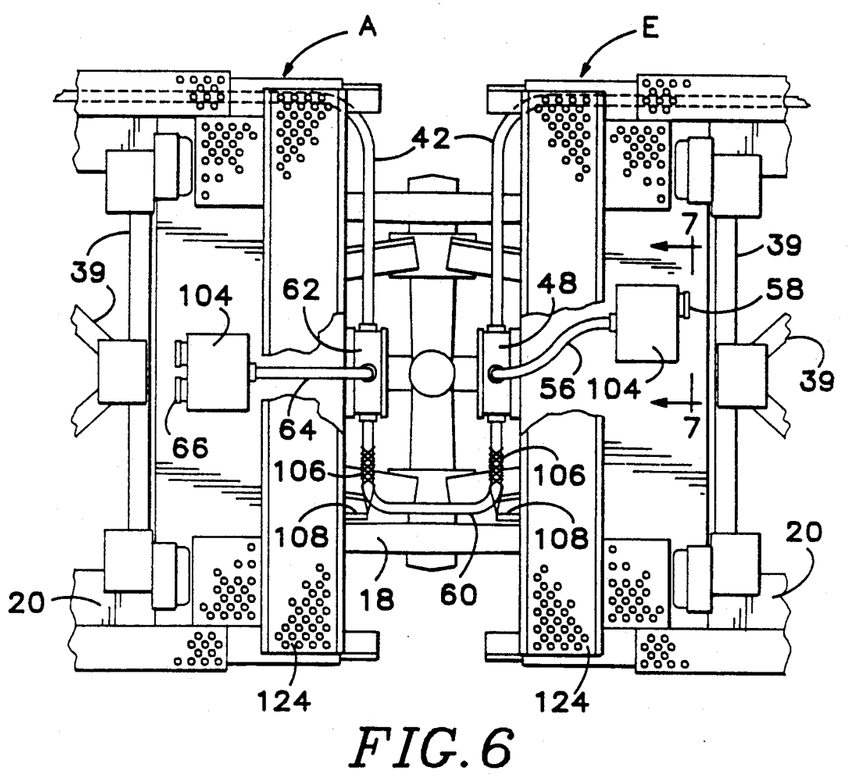
FIG. 6 is a top plan view of the "A" end of the E-unit, and the adjacent "B" end of the A-unit of the car, taken in the direction of line 6—6 of FIG. 1, at an enlarged scale.
Figure 7:
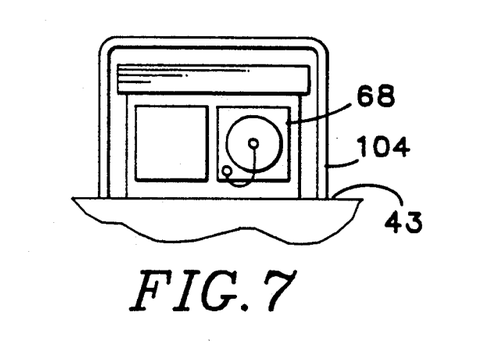
FIG. 7 is a view of a single plug power outlet receptacle, taken in the direction of line 7—7 of FIG. 6, at an enlarged scale.
Figure 9:
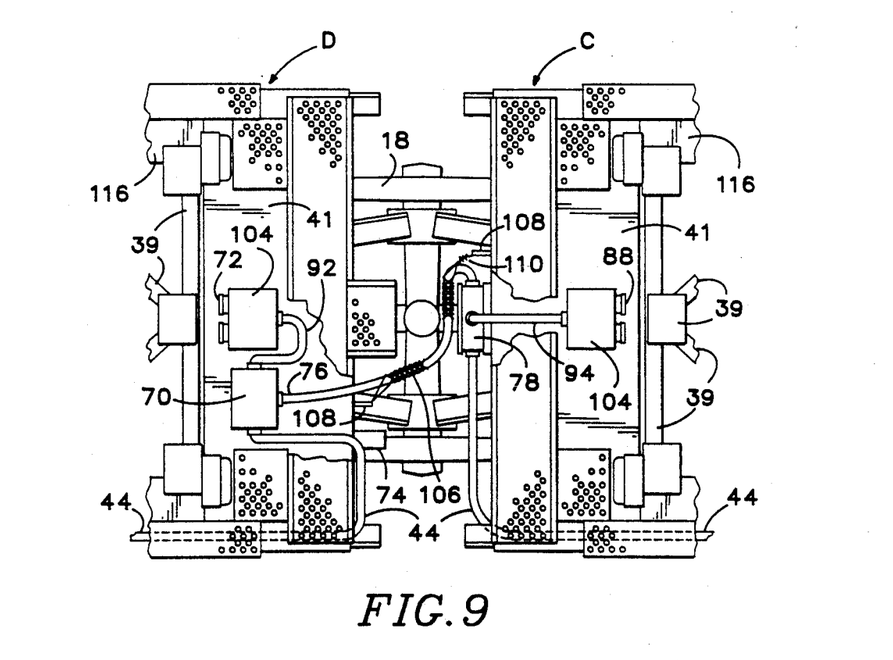
FIG. 9 is a top plan view of the "B" end of the D-unit and the "A" end of the C-unit, taken in the direction of line 9—9 of FIG. 1, at an enlarged scale.

As shown in FIG. 9, the junction box 70 is located atop the body bolster 41, alongside a dual plug power outlet 72, in order not to interfere with the room needed for a brake-controlling load-sensing device 74 associated with the truck 18 located between the C-unit and D-unit of the car 12. A flexible jumper cable segment 76 of the cable 44 therefore extends in a diagonal direction, rather than having the U-shaped arrangement of the jumper cable segment 60 shown in FIG. 6, to a junction box 78 carried on the "A" end of the C-unit. From the junction box 78 the cable 44 extends longitudinally along a side wall 35 of the C-unit to a junction box 80 at the "B" end of the C-unit. The cable 44 extends further as a flexible jumper segment 82 in a U-shaped arrangement to a junction box 84 at the "A" end of the B-unit, and finally longitudinally along the side wall 35 of the B-unit to a single-plug power outlet receptacle 86 atop the body bolster 43 at the "B" end of the B-unit, in essentially the same arrangement as that of the cable 42 on the E-unit and the A-unit.

Double plug power outlet receptacles 72, 88, and 90 are thus located, respectively, atop the respective body bolsters 41, 43 at the "B" end of the D-unit, the "A" end of the C-unit, and the "A" end of the B-unit. The receptacles 72, 88, and 90 are connected electrically to the cable 44 through respective short branch cables 92, 94, and 96 extending to the junction boxes 70, 78, and 84. Single plug power outlet receptacles 98 and 86 are located, respectively, at the "B" ends of the C-unit and the B-unit and are connected, respectively, to a branch cable 100 from the junction box 80, and to the end of the cable 44.

Stout channel-shaped standards 102 of metal plate material extend vertically from the top of the body bolster 41 at the "A" end of the D-unit, protectively housing and supporting the respective power feed receptacles 38 and circuit breakers 40 for each of the main power distribution cables 42 and 44. The power outlet plug receptacles 52, 58, 66, 68, 72, 86, 88, 90, and 98 located atop the respective body bolsters 41, 43 at the respective ends of the car units are covered by stout shields 104 of steel plate material in the form of inverted U-shaped channels, protecting the power outlet receptacles from being damaged as by articles dropped during the process of loading or off-loading the car 12. Nevertheless, with the power outlet plug receptacles 52, 58, etc., located atop the respective body bolsters 41, 43, each power outlet plug receptacle is readily accessible to receive a plug of a pigtail power cable and provide a direct, short, cable interconnection between the car 12 and the power-consuming equipment of a cargo container carried on a respective car unit.

Because the several units of the car 12 are interconnected with one another by articulating couplings so that they share the trucks 18, the adjacent ones of the car units are free to move relative to one another. In order to keep the flexible portions 45, 60, 76, and 82 of the power cables 42, 44 from rubbing against portions of the trucks 18, the flexible cable portions are preferably supported from the body bolsters 41 by means of stocking-type cable grips 106 supported by arms 108 mounted on and extending outwardly from the body bolsters 41. A link 110 may be used between each cable grip 106 and the arm 108. The flexible portions 45, 60, 76, and 82 of the cables 42, 44 are thus supported so as not to come into contact with other parts of the car during operation of the car 12 as part of a train.

Figure 10:
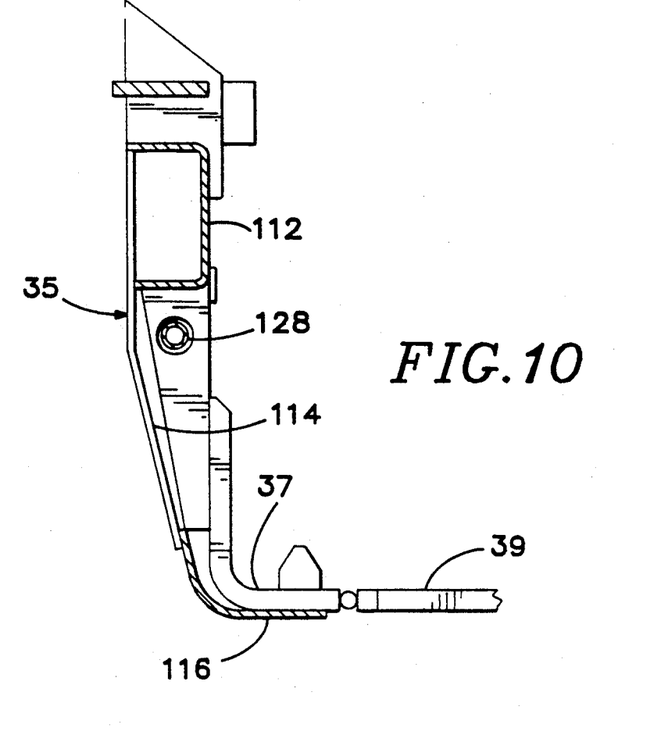
FIG. 10 is a sectional view of a side wall of the container well of the A-unit of the car shown in FIG. 1, taken along line 10—10 of FIG. 8, at an enlarged scale.
Figure 11:
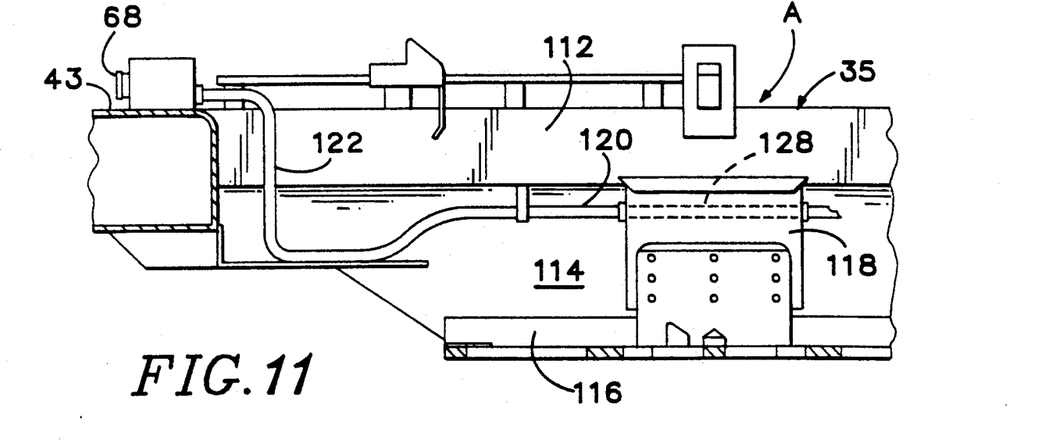
FIG. 11 is a sectional view of a portion of the body bolster of the A-unit of the car shown in FIG. 1, together with a portion of the side wall thereof, taken in the direction of line 11—11 of FIG. 8, at an enlarged scale.

Referring now also to FIGS. 10 and 11, the structure of the side wall 35, or well wall of the car 12 in a preferred embodiment of the invention includes a top tube 112 which is a major structure providing structural strength in the side wall 35. A longitudinal vertical side plate 114 extends generally vertically downward beneath the top tube 112 and extends longitudinally for substantially the entire length of the car 12, and a lower flange member 116 provides additional structural strength. This side wall structure provides a protected location beneath the top tube 112 and laterally inward from the side plate 114. This protected location is located laterally outward from every location within the container well 20 where a cargo container can ever be located. The portions of the power cables 42 and 44 extending longitudinally along the side walls 35 of the units of the car 12 are located thus protected by the presence of the top tube 112 (or corresponding structure) and the side plate 114, so that there is no danger of the cable 42 or 44 being damaged by container handling equipment or containers during the process of loading or unloading the car 12. Preferably, the straight portions of cables 42 and 44, extending along the side walls of the car units, are protected further by a rigid metal conduit 120, preferably of galvanized steel, and extend through appropriate openings provided in structural members such as container support member attachment brackets 118 located along the side walls of the car units. In each location where the cable 42 or 44 thus passes through a structure such as the container support member attachment brackets 118 or other structure associated with the laterally inward side of the well wall side plate 114, as shown in FIG. 11 heavy walled steel pipe 128 is installed to reinforce the pierced structural elements while also providing protection for the cable. The portions 122 of the cable 42 or 44 between the container wells 20 and the body bolsters are also protected by metal conduits, preferably of a type which may be bent to the required configuration during installation but which thereafter remain rigid, protecting the insulated conductors of the cable.

In this fashion the cables 42 and 44 are well protected, and no cables need to be extended in exposed positions along the length of any containers carried in car 12, so long as the containers are correctly loaded into the car 12 with the equipment requiring elective power located at the logically correct ends of the respective car unit.

Walkways 124 and 126 of perforated sheet metal are located at each end of each car unit, in positions which are above respective portions of the cables 42, 44 and the branch cables 56, 64, etc., so that the walkways provide additional protection against mechanical damage.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A multi-unit railway freight car for carrying intermodal cargo containers, at least one of said cargo containers including equipment requiring electrical power during carriage on the car, the car comprising:

(a) a plurality of car units, each defining a container well for receiving at least one cargo container;

(b) a main power cable extending from a first one of said car units to at least one other of said car units;

(c) a power feed receptacle located in said first one of said car units, said main power cable being connected to said power feed receptacle;

(d) respective circuit load limiting means located in each said other car unit to which said main power cable extends, for protecting said main power cable against electrical overload, said main power cable being connected electrically to each said circuit load limiting means; and (e) respective power outlet means electrically connected with each said respective load limiting means for providing electrical power to a unit of said equipment included in a cargo container located for carriage on the one of said car units in which the respective circuit load limiting means is located.

2. The multi-unit freight car of claim 1 wherein said power outlet means includes a plurality of separate plug receptacles, for distributing power to a plurality of said units of said equipment.

3. The multi-unit freight car of claim 1, including two of said power feed receptacles and two of said main power cables, each connected to a respective power feed receptacle and extending to at least one said other car units.

4. The multi-unit freight car of claim 3, including at least five of said car units interconnected by articulating couplings, each of said main power cables extending from said first one of said car units to respective ones of said load limiting means located on a respective plurality of said other car units.

5. The multi-unit freight car of claim 1, said plurality of car units including a pair of end units and said first car unit being an intermediate unit located between said end units.

6. The multi-unit freight car of claim 1 wherein each of said car units has a pair of opposite ends and said respective power outlet means located in one of said car units includes a plug receptacle located at each end of said one of said car units for making power available for at least two cargo containers to be carried on said one of said car units.

7. The multi-unit freight car of claim 6 wherein at least one of said other car units includes three plug receptacles for making power available to three cargo containers carried on each such other car unit.

8. The multi-unit freight car of claim 1 wherein each of said car units has a length and said main power cable includes a longitudinal segment protected by a conduit, said longitudinal segment extending along a majority of the length of one of said car units, in a location adjacent said container well of said one of said car units and laterally outward of each location available for receiving a cargo container in said container well.

9. The multi-unit freight car of claim 1, said main power cable including a flexible portion thereof extending between adjacent ones of said car units and spring tension strain relief means for supporting said flexible portion of said main power cable between said adjacent ones of said car units.

10. A multi-unit railway freight car for carrying intermodal cargo containers, at least one of said cargo containers including equipment requiring electrical power during carriage on the car, the car comprising:

(a) a plurality of car units each defining a container well for receiving at least one cargo container, each container well having a length and being defined by a pair of opposite longitudinal well walls, each said longitudinal well wall including a vertical longitudinal plate structure extending over substantially the entire length of said container well;

(b) an electrical power cable extending from a first one of said car units to at least one other one of said car units;

(c) a power feed receptacle located in said first one of said car units, said power cable being connected electrically to receive power through said power feed receptacle;

(d) a plurality of electrical power delivery terminals connected electrically with said power cable, said power delivery terminals being located on said other ones of said car units in respective locations convenient for delivery of electric power therefrom to respective cargo containers carried by said other ones of said car units;

(e) a respective longitudinal segment of said power cable extending along at least a majority of the length of said container well of each of said other ones of said car units in which one of said electrical power delivery terminals is located, each said respective longitudinal segment being located laterally inward of said vertical plate structure of a respective one of said longitudinal well walls and laterally outward of each location available for receiving a cargo container in said container well.

11. The multi-unit freight car of claim 10 wherein said longitudinal segment of said power cable is protected by a metal conduit.

12. The multi-unit freight car of claim 10 wherein each of said longitudinal well walls includes a main load-bearing upper structural member, said longitudinal segment of said power cable being located beneath said main load-bearing upper structural member.

13. The multi-unit freight car of claim 10 wherein each of said car units includes a pair of body bolsters extending transversely between said longitudinal well walls and each of said power delivery terminals is located atop a respective one of said body bolsters.

14. The multi-unit freight car of claim 13 including a respective outlet protective shield of metal plate attached to each of said body bolsters on which one of said power delivery terminals is located.

* * * * *